United States Patent
Grumstrup et al.

(10) Patent No.: US 9,465,391 B2
(45) Date of Patent: Oct. 11, 2016

(54) VALVE POSITIONER WITH OVERPRESSURE PROTECTION CAPABILITIES

(71) Applicant: FISHER CONTROLS INTERNATIONAL LLC, Marshalltown, IA (US)

(72) Inventors: Bruce Frederick Grumstrup, Marshalltown, IA (US); Lorin Dion Miller, Colo, IA (US); Jimmie Lee Snowbarger, Marshalltown, IA (US); Adam Joseph Wittkop, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 148 days.

(21) Appl. No.: 14/151,585

(22) Filed: Jan. 9, 2014

(65) Prior Publication Data

US 2015/0192931 A1   Jul. 9, 2015

(51) Int. Cl.
 *F16K 31/12* (2006.01)
 *G05D 16/20* (2006.01)

(52) U.S. Cl.
 CPC ........ *G05D 16/202* (2013.01); *Y10T 137/0379* (2015.04); *Y10T 137/7761* (2015.04)

(58) Field of Classification Search
 CPC .............. G05D 16/202; G05D 16/20; G05D 16/2066; F16K 17/10; Y10T 137/0379; Y10T 137/7761; Y10T 137/7768; Y10T 137/7762; Y10T 137/8225; Y10T 137/8242; Y10T 137/8326
 See application file for complete search history.

(56) References Cited

U.S. PATENT DOCUMENTS

| | | | | |
|---|---|---|---|---|
| 5,451,923 A * | 9/1995 | Seberger | ................ | G08C 19/02 340/12.32 |
| 5,687,098 A * | 11/1997 | Grumstrup | ......... | G05B 23/0202 137/487.5 |
| 6,272,401 B1 * | 8/2001 | Boger | .................... | F15B 5/006 700/282 |

(Continued)

FOREIGN PATENT DOCUMENTS

| WO | WO-99/05576 A2 | 2/1999 |
|---|---|---|
| WO | WO-99/17042 A1 | 4/1999 |

(Continued)

OTHER PUBLICATIONS

International Search Report and Written Opinion for Application No. PCT/US2015/010548, dated Apr. 24, 2015.

*Primary Examiner* — Jessica Cahill
(74) *Attorney, Agent, or Firm* — Marshall, Gerstein & Borun LLP (57) ABSTRACT

A method of limiting control pressure provided to an actuator of a valve coupled to a valve positioner, a drive signal is provided to a pneumatic stage of the valve positioner. The pneumatic stage is arranged to control output pressure of the valve positioner in accordance with the drive signal. A pressure measurement from a pressure sensor communicatively coupled to the valve positioner is obtained, and an abnormal pressure is detected based on the pressure measurement. In response to detecting the abnormal pressure, the drive signal is controlled so as to limit the output pressure of the valve positioner, wherein the output pressure provides control pressure to the actuator.

15 Claims, 7 Drawing Sheets

(56) References Cited

U.S. PATENT DOCUMENTS

| | | | |
|---|---|---|---|
| 6,382,226 B1* | 5/2002 | Larson | F16K 37/0091 137/1 |
| 6,999,853 B2* | 2/2006 | Junk | F15B 5/006 251/129.01 |
| 7,925,386 B2* | 4/2011 | Krippner | G05D 7/0635 137/486 |
| 2009/0222220 A1* | 9/2009 | Wilke | F16K 37/0091 702/34 |
| 2012/0139725 A1* | 6/2012 | Grumstrup | F16K 37/0083 340/540 |
| 2012/0216898 A1* | 8/2012 | Carter | F15B 11/068 137/861 |

FOREIGN PATENT DOCUMENTS

| | | | | |
|---|---|---|---|---|
| WO | WO 2006015380 A2 | * | 2/2006 | G05B 5/00 |
| WO | WO 2008086289 A1 | * | 7/2008 | F16K 37/0091 |

* cited by examiner

VALVE POSITIONER WITH OVERPRESSURE PROTECTION CAPABILITIES

FIELD OF THE INVENTION

The present invention relates generally to process control systems and, more particularly, to providing overpressure protection for process control devices in process control systems.

DESCRIPTION OF THE RELATED ART

Process control systems, such as distributed or scalable process control systems like those used in chemical, petroleum or other processes, typically include one or more process controllers communicatively coupled to one or more field devices via analog, digital, or combined analog/digital buses. The field devices, which may include, for example, control valve assemblies (e.g., control valves, actuators, valve controllers), valve positioners, switches, and transmitters (e.g., temperature, pressure and flow rate sensors), perform functions within the process such as opening or closing valves, measuring process parameters, and performing basic diagnostics. The process controller receives signals indicative of process measurements made by the field devices and/or other information pertaining to the field devices, and uses this information to execute or implement one or more control routines to generate control signals, which are sent over the buses to the field devices to control the operation of the process. Information from each of the field devices and the controller is typically made available to one or more applications executed by one or more other hardware devices, such as host or user workstations, personal computers or computing devices, to enable an operator to perform any desired function regarding the process, such as setting parameters for the process, viewing the current state of the process, modifying the operation of the process, etc.

Process control systems often employ electro-pneumatic controllers (e.g., electro-pneumatic positioners) to control process control devices operating in the process control systems (e.g., control valves, pumps, dampers, etc.). Electro-pneumatic controllers are usually configured to receive one or more control signals and convert those control signals into a pressure provided to a pneumatic actuator to cause a desired operation of the process control device coupled to the pneumatic actuator. For example, if a process control routine requires a pneumatically-actuated valve to pass a greater volume of a process fluid, the magnitude of the control signal applied to an electro-pneumatic controller associated with the valve may be increased (e.g., from 10 milliamps (mA) to 15 mA in a case where the electro-pneumatic controller is configured to receive a 4-20 mA control signal).

An electro-pneumatic controller typically includes a pneumatic module, which may include a first pneumatic stage, such as a current to pressure (I/P) transducer or voltage to pressure (E/P) transducer, and a second pneumatic stage, such as a relay. The pneumatic module typically receives a pressurized supply fluid, such as air, and modulates the pressurized supply fluid in accordance with a control signal (e.g., a current drive signal) to produce a pneumatic output signal in response to the control signal. The supply fluid is typically supplied to the electro-pneumatic controller and, more specifically, to the pneumatic stage of the electro-pneumatic controller, via a supply pressure regulator, such as an airset device or an air filter device, provided between a pressure source and a pressure supply input of the electro-pneumatic device. The pressure regulator is typically arranged to provide a suitable supply pressure that ensures that the control pressure output of the elector-pneumatic controller does not exceed a certain maximum pressure (e.g., a maximum control pressure rating of an actuator being controlled by the electro-pneumatic controller), thereby providing overpressure protection for the device being controlled.

A failure or a malfunction of the pressure regulator, however, may result in over-pressuring the device being controlled by the electro-pneumatic controller, which may damage the device being controlled (e.g. rupture an actuator) and may lead to a potentially dangerous situation within the process control system. To protect the device in case of a failure or a malfunction of the pressure regulator, a relief valve is often coupled between the control pressure output of the electro-pneumatic controller and a control pressure input of the device being controlled by the controller. The relief valve bleeds control fluid to, for example, the atmosphere when the pressure of the control fluid increases due, for example, to failure or malfunction of the pressure regulator device. As such, the relief valve provides redundant over-pressure protection to the device to avoid over-pressurizing the device in case of a failure or a malfunction of the supply fluid regulator device. However, such relief valves may be expensive and inconvenient and/or may be difficult to install in process control devices.

SUMMARY

In accordance with a first exemplary aspect, a method of limiting control pressure provided to an actuator of a valve coupled to a valve positioner. The method includes providing a drive signal to a pneumatic stage of the valve positioner, wherein the pneumatic stage is arranged to control output pressure of the valve positioner in accordance with the drive signal. The method also includes obtaining a pressure measurement from a pressure sensor communicatively coupled to the valve positioner, and detecting an abnormal pressure based on the pressure measurement. The method further includes in response to detecting the abnormal pressure, controlling the drive signal so as to limit the output pressure of the valve positioner, wherein the output pressure provides control pressure to the actuator.

In accordance with a second exemplary aspect, a process control device comprises a valve, an actuator coupled to the valve and configured to control a position of the valve, and a valve positioner coupled to the valve and to the actuator and configured to provide a control pressure to the actuator to control a position of the actuator. The valve positioner comprises a pneumatic stage arranged to receive a drive signal and to control output pressure of the valve positioner in accordance with the drive signal. The valve positioner additionally comprises an overpressure protection module configured to obtain a measurement from a pressure sensor communicatively coupled to the valve positioner, detect an abnormal pressure based on the pressure measurement, and in response to detecting the abnormal pressure, control the drive signal so as to limit the output pressure of the valve positioner, wherein the output pressure provides the control pressure to the actuator.

In accordance with a third exemplary aspect, a valve positioner coupled to a process control device comprising a valve and an actuator, the valve positioner configured to receive a control signal from a process control system and to control a pressure supplied to the actuator in accordance with the control signal. The valve positioner comprises a pneumatic stage arranged to receive a drive signal and to control output pressure of the valve positioner in accordance with the drive signal. The overpressure protection module additionally comprises an overpressure protection module configured to obtain a measurement from a pressure sensor communicatively coupled to the valve positioner, detect an abnormal pressure based on the pressure measurement, and in response to detecting the abnormal pressure, control the drive signal so as to limit the output pressure of the valve positioner, wherein the output pressure provides the control pressure to the actuator.

In further accordance with any one or more of the forgoing first, second, or third aspects, a method, a process control device and/or a valve positioner may further include any one or more of the following preferred forms.

In one preferred form, the pressure sensor is configured to sense a level of a supply pressure provided to the valve positioner.

In another preferred form, the pressure sensor is configured to sense a level of the output pressure of the valve positioner.

In another preferred form, detecting the abnormal pressure comprises comparing the pressure measurement to a predetermined threshold, and determining that the pressure is abnormal when the measured pressure exceeds the predetermined threshold.

In another preferred form, the valve positioner includes a processor and a memory, and detecting the abnormal pressure and controlling the drive signal comprises executing computer readable instructions stored in the memory.

In another preferred form the valve positioner includes a control circuit configured to receive the pressure measurement, and detecting the abnormal pressure and controlling the drive signal is performed by the control circuit.

In another preferred form the drive signal is a current signal, and controlling the drive signal comprises setting the drive signal to a value at or near zero milliamperes.

In another preferred form the drive signal is a voltage signal, and controlling the drive signal comprises setting the drive signal to a value at or near zero millivolts.

In another preferred form, the overpressure protection module is configured to compare the pressure measurement to a predetermined threshold, and determine that the pressure is abnormal when the measured pressure exceeds the predetermined threshold.

In another preferred form, the valve positioner includes a processor and a memory, and the overpressure protection module comprises computer readable instructions stored in the memory and executable by the processor.

In another preferred form, the overpressure protection module comprises a hardware control circuit.

In another preferred form, the drive signal is a current drive signal, and the overpressure detection module is configured to, in response to detecting the abnormal pressure, set the drive signal to zero to a value at or near zero milliaperes.

In another preferred form, the drive signal is a voltage drive signal, and the overpressure detection module is configured, in response to detecting the abnormal pressure, set the drive signal to a value at or near zero millivolts.

DETAILED DESCRIPTION

Figure 1:
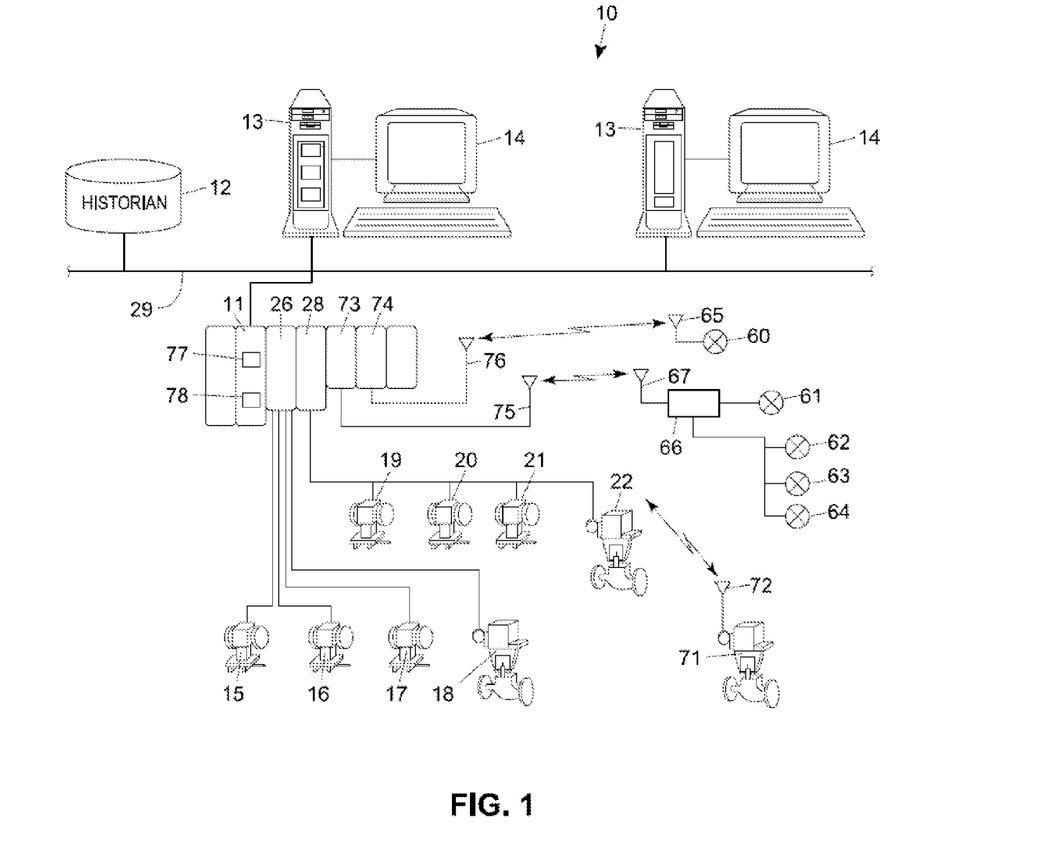
FIG. 1 is a schematic representation of a process control system having one or more field devices arranged in accordance with the principles of the present disclosure.

Referring now to FIG. 1, a process control system 10 constructed in accordance with one version of the present disclosure is depicted incorporating one or more field devices 15, 16, 17, 18, 19, 20, 21, 22, and 71 in communication with a process controller 11, which in turn, is in communication with a data historian 12 and one or more user workstations 13, each having a display screen 14. So configured, the controller 11 delivers signals to and receives signals from the field devices 15, 16, 17, 18, 19, 20, 21, 22, and 71 and the workstations 13 to control the process control system.

In additional detail, the process controller 11 of the process control system 10 of the version depicted in FIG. 1 is connected via hardwired communication connections to field devices 15, 16, 17, 18, 19, 20, 21, and 22 via input/output (I/O) cards 26 and 28. The data historian 12 may be any desired type of data collection unit having any desired type of memory and any desired or known software, hardware or firmware for storing data. Moreover, while the data historian 12 is illustrated as a separate device in FIG. 1, it may instead or in addition be part of one of the workstations 13 or another computer device, such as a server. The controller 11, which may be, by way of example, a DeltaV™ controller sold by Emerson Process Management, is communicatively connected to the workstations 13 and to the data historian 12 via a communication network 29 which may be, for example, an Ethernet connection.

As mentioned, the controller 11 is illustrated as being communicatively connected to the field devices 15, 16, 17, 18, 19, 20, 21, and 22 using a hardwired communication scheme which may include the use of any desired hardware, software and/or firmware to implement hardwired communications, including, for example, standard 4-20 mA communications, and/or any communications using any smart communication protocol such as the FOUNDATION® Fieldbus communication protocol, the HART® communication protocol, etc. The field devices 15, 16, 17, 18, 19, 20, 21, and 22 may be any types of devices, such as sensors, control valve assemblies, transmitters, positioners, etc., while the I/O cards 26 and 28 may be any types of I/O devices conforming to any desired communication or controller protocol. In the embodiment illustrated in FIG. 1, the field devices 15, 16, 17, 18 are standard 4-20 mA devices that communicate over analog lines to the I/O card 26, while the digital field devices 19, 20, 21, 22 can be smart devices, such as HART® communicating devices and Fieldbus field devices, that communicate over a digital bus to the I/O card 28 using Fieldbus protocol communications. Of course, the field devices 15, 16, 17, 18, 19, 20, 21, and 22 may conform to any other desired standard(s) or protocols, including any standards or protocols developed in the future.

In addition, the process control system 10 depicted in FIG. 1 includes a number of wireless field devices 60, 61, 62, 63, 64 and 71 disposed in the plant to be controlled. The field devices 60, 61, 62, 63, 64 are depicted as transmitters (e.g., process variable sensors) while the field device 71 is depicted as a control valve assembly including, for example, a control valve and an actuator. Wireless communications may be established between the controller 11 and the field devices 60, 61, 62, 63, 64 and 71 using any desired wireless communication equipment, including hardware, software, firmware, or any combination thereof now known or later developed. In the version illustrated in FIG. 1, an antenna 65 is coupled to and is dedicated to perform wireless communications for the transmitter 60, while a wireless router or other module 66 having an antenna 67 is coupled to collectively handle wireless communications for the transmitters 61, 62, 63, and 64. Likewise, an antenna 72 is coupled to the control valve assembly 71 to perform wireless communications for the control valve assembly 71. The field devices or associated hardware 60, 61, 62, 63, 64, 66 and 71 may implement protocol stack operations used by an appropriate wireless communication protocol to receive, decode, route, encode and send wireless signals via the antennas 65, 67 and 72 to implement wireless communications between the process controller 11 and the transmitters 60, 61, 62, 63, 64 and the control valve assembly 71.

If desired, the transmitters 60, 61, 62, 63, 64 can constitute the sole link between various process sensors (transmitters) and the process controller 11 and, as such, are relied upon to send accurate signals to the controller 11 to ensure that process performance is not compromised. The transmitters 60, 61, 62, 63, 64, often referred to as process variable transmitters (PVTs), therefore may play a significant role in the control of the overall control process. Additionally, the control valve assembly 71 may provide measurements made by sensors within the control valve assembly 71 or may provide other data generated by or computed by the control valve assembly 71 to the controller 11 as part of its operation. Of course, as is known, the control valve assembly 71 may also receive control signals from the controller 11 to effect physical parameters, e.g., flow, within the overall process.

The process controller 11 is coupled to one or more I/O devices 73 and 74, each connected to a respective antenna 75 and 76, and these I/O devices and antennas 73, 74, 75, 76 operate as transmitters/receivers to perform wireless communications with the wireless field devices 61, 62, 63, 64 and 71 via one or more wireless communication networks. The wireless communications between the field devices (e.g., the transmitters 60, 61, 62, 63, 64 and the control valve assembly 71) may be performed using one or more known wireless communication protocols, such as the WirelessHART® protocol, the Ember protocol, a WiFi protocol, an IEEE wireless standard, etc. Still further, the I/O devices 73 and 74 may implement protocol stack operations used by these communication protocols to receive, decode, route, encode and send wireless signals via the antennas 75 and 76 to implement wireless communications between the controller 11 and the transmitters 60, 61, 62, 63, 64 and the control valve assembly 71.

As illustrated in FIG. 1, the controller 11 conventionally includes a processor 77 that implements or oversees one or more process control routines (or any module, block, or sub-routine thereof) stored in a memory 78. The process control routines stored in the memory 78 may include or be associated with control loops being implemented within the process plant. Generally speaking, and as is generally known, the process controller 11 executes one or more control routines and communicates with the field devices 15, 16, 17, 18, 19, 20, 21, 22, 60, 61, 62, 63, 64, and 71, the user workstations 13 and the data historian 12 to control a process in any desired manner(s).

Figure 2:
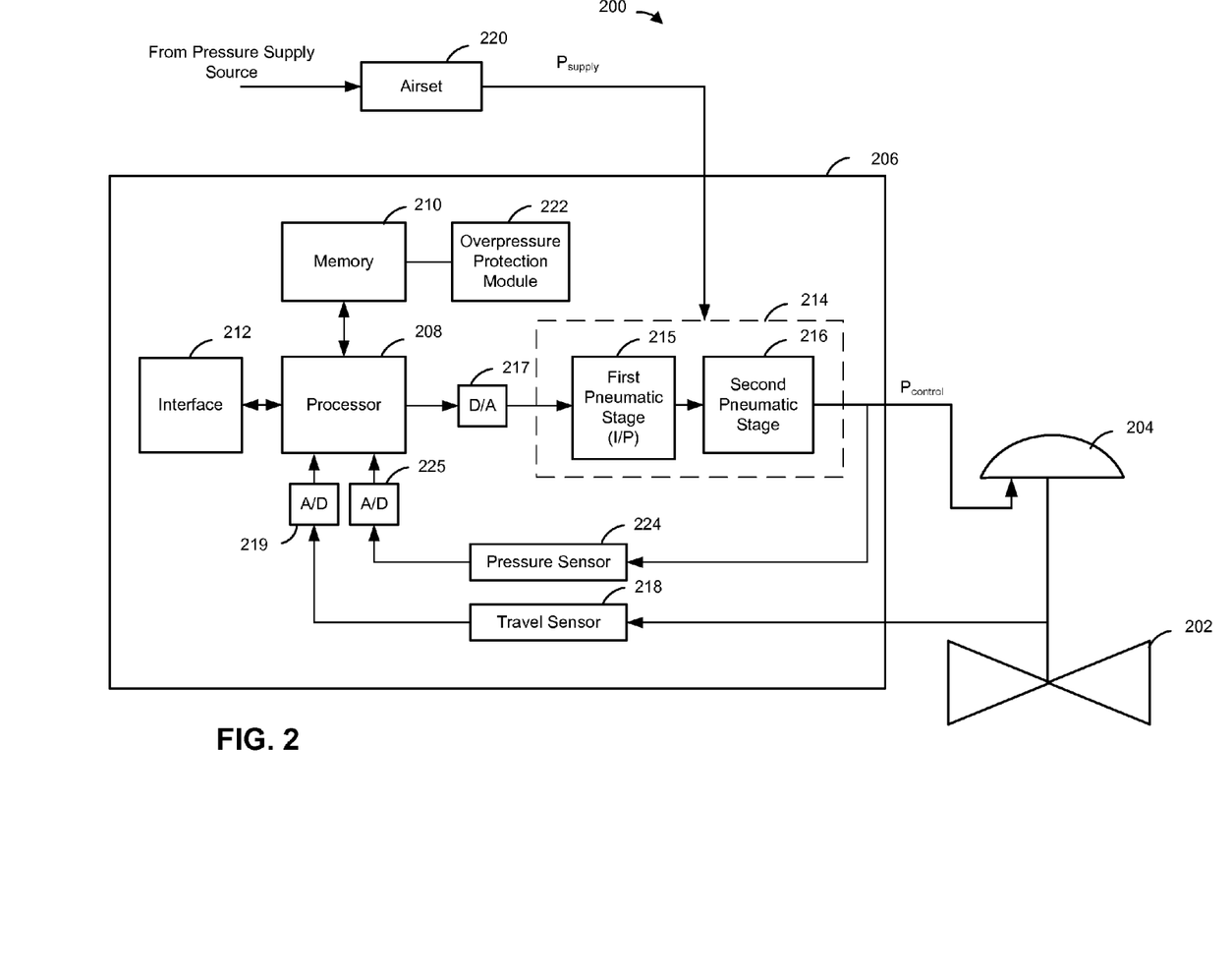
FIG. 2 is a block diagram of an example field device arranged in accordance with an embodiment of the present disclosure.

FIG. 2 is a block diagram of an example field device 200 arranged in accordance with an embodiment of the present disclosure. The field device 200 may be incorporated within a process control system such as the example process control system 100 of FIG. 1. With reference to FIG. 1 the field device 200 may be one of the field devices 15-18 which communicates with the controller 11 over an analog connection using standard 4-20 mA communication, for example. In another embodiment, the field device 200 may be one of the field devices 19-22 which communicates with the controller 11 over a digital bus using a digital communication protocol, such as a HART or a fieldbus protocol, or any other suitable digital communications protocol. In still another embodiment, the field device 200 may be the field device 72 which communicates with the controller 11 via a wireless connection using any suitable wireless communication protocol. In this embodiment, the field device 200 includes an antenna (not shown) included in or coupled to the field device 200 to enable wireless communication between the field device 200 and the controller 11.

The field device 200 is illustrated in FIG. 2 as a control valve assembly having a valve 202, an actuator 204, and a valve positioner 206 communicatively coupled to the valve 202 and the actuator 204. The valve 202 may be, for example, a rotary valve, a quarter-turn valve, a damper, or any other control device or apparatus. The actuator 204 may be a pneumatic actuator operatively coupled to a flow control member within the valve 202 via a valve stem, for example. The valve stem may move flow control member in a first direction (e.g., away from the valve seat) to allow fluid flow between the inlet and the outlet and in a second direction (e.g., toward the valve seat) to restrict or prevent fluid flow between the inlet and the outlet. In various embodiments, the actuator 204 may include a double-acting piston actuator, a single-acting spring return diaphragm or piston actuator, or any other suitable actuator or process control device.

In FIG. 2, the valve positioner 206 is illustrated as a digital valve positioner having a processor 208, a memory 210, and an interface module 212. Additionally, the valve positioner 206 includes a pneumatic module 214 having a first pneumatic stage 215 and a second pneumatic stage 216. The first pneumatic stage 215 may be an electro pneumatic transducer, such as a current to pressure (I/P) transducer, a voltage to pressure (E/P) transducer, etc., that may generate an output pressure proportion to a drive signal provided to the first pneumatic stage 215. The second pneumatic stage 216 may operate to amplify the pressure generated by the first pneumatic stage 215 to produce a pressure suitable for operation of the actuator 204. The second pneumatic stage 216 may be, for example, a spool valve, a poppet valve, a relay, etc. The network interface 212 of the valve positioner 206 is configured to transmit and/or receive signals according to a particular communication protocol of the process control system of which the field device 200 is a part. In some embodiments, the communication protocol is a wireless mesh network protocol, such as the WirelessHART or ISA 100.11a protocol, Alternatively, the network interface 212 may support wired communications, such as standard 4-20 mA communications, and/or any communications using any smart communication protocol such as the FOUNDATION® Fieldbus communication protocol, the HART® communication protocol, etc. In some embodiments, the network interface 212 includes a transceiver (not shown). The transceiver typically includes one or more processors (also not shown) for executing instructions relating to physical (PHY) layer and other layer (e.g., medium access control (MAC) layer) tasks according to the wireless communication protocol utilized by the process control system. The network interface may be coupled to one or more antennas (not shown). Via the one or more antennas, the network interface 212 transmits and/or receives data packets according to the wireless communication protocol. The network interface 212 is preferably configured to both transmit and receive data packets.

The processor 208 may be a general purpose processor, a digital signal processor, an ASIC, field programmable gate array, or any other know or later developed processor. The processor 208 operates pursuant to instructions stored in the memory 210. While the example field device 200 of FIG. 2 includes one processor 208, other embodiments may include two or more processors that perform the functions of the processor 208. The memory 210 may be a volatile memory or a non-volatile memory. The memory 210 may include one or more of a read-only memory (ROM), random-access memory (RAM), a flash memory, an electronic erasable program read-only memory (EEPROM), or other type of memory. The memory 210 may include an optical, magnetic (hard drive), or any other form of data storage device.

In operation, the processor 208 receives a command signal, such as a 4 to 20 mA command signal or a 0 to 10 V command signal, that represents a desired position of the valve 202. The processor 208 also receives an indication of an actual position of the valve 202 provided to the processor 208 by a travel sensor 218. The travel sensor 218 may be an analog travel sensor and may be coupled to the processor 208 via an analog to digital converter 219. The analog to digital converter 219 may convert the analog signal produced by the travel sensor 218 to a digital signal suitable for use by the processor 208. In another embodiment, the travel sensor 218 may be a digital sensor. For example, the travel sensor 218 may include an analog to digital converter internal to the travel sensor 218. In this case, the analog to digital converter 219 may be omitted and the output of the travel sensor 218 may be provided directly to the processor 208.

The processor 208 compares the desired position for the valve 202 indicated by the command signal received from the process controller with the actual position of the valve 202 indicated by the travel sensor 218, and generates a drive signal for the pneumatic module 214 based on a difference between the desired position and the actual position of the valve 202. The drive signal may be a current drive signal or a voltage drive signal, for example. The drive signal corresponds to an amount the valve positioner 206 is to change the position of the actuator 204 coupled to the valve 202. The drive signal generated by the processor 208 is provided to the first pneumatic stage 215 of the pneumatic module 214 via a digital to analog converter 217, which converts the (digital) drive signal generated by the processor 208 to an analog drive signal suitable for driving the first pneumatic stage 215. The first pneumatic stage 215 modulates a pressurized supply fluid supplied to first pneumatic stage 215 in accordance with the drive signal to produce an output pressure that is proportional to the drive signal. The output pressure of the first pneumatic stage 215 is provided to the second pneumatic stage 216 which may amplify the pressure output of the first pneumatic stage 215 and may provide the amplified pressure to the pressure output of the valve positioner 206. The pressure output of the valve positioner 206 is coupled to a control pressure input of the actuator 204 and provides the control pressure for the actuator 204 to control the position of the actuator 204, thereby controlling the valve 202 to move towards the desired position for the valve 202.

It should be noted that while the first pneumatic stage 215 is generally described herein as being a proportional I/P transducer, the first pneumatic stage 215 may instead be an on/off transducer. In this case, the pneumatic module 214 may alternate between providing the pressurized supply fluid to the control pressure input of the actuator 204, and exhausting the pressurized supply fluid (e.g., to the atmosphere), thereby controlling the position of the actuator 204. It is also noted that the valve positioner 206 may include other type of position control mechanisms instead of or in addition to those illustrated in FIG. 2. Further, it should be understood that the field device 200 may be any other type of pneumatically controlled device operating within a process control system. For example, the field device 200 may be a damper, etc.

With continued reference to FIG. 2, the supply pressure may be provided to the valve positioner 206 and, more particularly, to the first pneumatic stage 215 and the second pneumatic stage 216, via a pressure regulator, such as an airset 220. The airset 220 may regulate and filter a pressurized supply fluid, such as air, provided by a pressure supply source within the process control system, and may reduce the pressure provided by the pressure supply source to a pressure level suitable for use by the valve positioner 206 and by the actuator 204. Generally, the valve positioner 206 produces output pressure by modulating the supply pressure, and the produced output pressure is typically pressurized at a level lower than the supply pressure. In some situations, the valve positioner 206 may output the full supply pressure provided to the valve positioner 206 to the actuator 204 so as to provide a maximum force to the actuator 204, for example to force the valve 202 into a valve seat. By regulating and/or reducing the pressure provided by the pressure supply source, the pressure regulator 220 typically ensures that the output control pressure of the valve positioner 206 does not exceed a certain a maximum level, such as a maximum pressure rating of the actuator 204, thereby providing overpressure protection for the actuator 204. However, in a case of a failure or a malfunction of the airset 220 (e.g., when the airset 220 is stuck open and, accordingly, supplies a full, rather than reduced, supply pressure to the valve positioner 206), the valve positioner 206 may produce a pressure output that exceeds a maximum rating of the actuator 204 or other desired maximum control pressure level for the actuator 204, for example in a situation in which the valve positioner 206 outputs the full supply pressure of the valve positioner 206 to the actuator 204, thereby exceeding the maximum control pressure of the actuator 204. Exceeding the maximum pressure of the actuator 204 may over-pressurize the actuator 204, which may damage the actuator 204 and/or may lead to a potentially dangerous situation in the process control system.

The valve positioner 206 includes an overpressure protection module 222 and a pressure sensor 224. The over-pressure module 222 generally ensures that a safe control pressure is provided to the actuator 204 even in cases of a failure or a malfunction of the airset 220, thereby providing additional or redundant overpressure protection for the actuator 204. In the embodiment of FIG. 2, the overpressure protection module 222 comprises computer readable instructions stored in the memory 210. The processor 208 is configured to execute the computer readable instructions to provide overpressure protection for the actuator 204. The overpressure protection module 222 may operate to limit the drive signal provided to the first pneumatic stage 215 to ensure that the pressure output of the valve positioner 206 does not exceed a certain maximum value, such as the maximum pressure rating of the actuator 204, or any other suitable value required or desired for operation of the actuator 204.

The pressure sensor 224 is coupled to the output pressure of the valve positioner 206 and is configured to provide measurements of the output pressure of the valve positioner 206 to the processor 208. The pressure sensor 224 may be an analog pressure sensor, in which case the output of the pressure sensor 224 may be coupled to an analog to digital converter 225. The analog to digital converter 225 may convert the analog signal produced by the pressure sensor 224 to a digital signal suitable for use by the processor 208. In another embodiment, the pressure sensor 224 may be a digital pressure sensor. For example, the pressure sensor 224 may include an analog to digital converter internal to the pressure sensor 224. In this case, the analog to digital converter 225 may be omitted and the output of the pressure sensor 224 may be provided directly to the processor 208.

The overpressure protection module 222 may monitor the pressure output of the valve positioner 206 by periodically obtaining pressure measurements provided by the pressure sensor 224. The overpressure protection module 222 may compare the measurements obtained from the pressure sensor 224 to a predetermined threshold, and may detect an abnormal (e.g., abnormally high) pressure when the measured pressure exceeds the predetermined threshold. In response to detecting the abnormal pressure, the overpressure protection module 222 may control the level of the drive signal supplied by the processor 208 to the first pneumatic stage 215 so as to limit the output pressure of the first pneumatic stage 215 and, accordingly, limit the output pressure of the valve positioner 206. For example, the overpressure protection module 222 may set the drive signal to a predetermined value, such as a value at or near zero milliamps in the case that the drive signal is a current drive signal, or a value at or near zero millivolts in the case that the drive signal is a voltage drive signal. Alternatively, the overpressure protection module 222 may set the drive signal to another suitable value, or may adjust the drive signal in another suitable manner, so as to reduce or limit the pressure output of the valve positioner 206.

As yet another example, in response to detecting the abnormal pressure, the overpressure protection module 222 may operate to prevent any further adjustments of the drive signal so as to stop any further adjustments of the output pressure level of the valve positioner 206. In this case, the output pressure level of the valve positioner 206 will stop responding to further changes in the command signal received by the valve positioner 206. As such, the output pressure of the valve positioner 206 will remain at a level produced by the valve positioner 206 prior to detection of the abnormal pressure, such as prior to malfunction or failure of the airset 220, in this embodiment. Alternatively, in response to detecting the abnormal pressure, the overpressure protection module 222 may operate to prevent any further increases in the level of the drive signal, while still allowing the level of the drive signal to decrease in response to receiving a command signal that results in a decrease of the dive signal level. In any event, the overpressure protection module 222, in response to detecting the abnormal pressure, operates to ensure that the output pressure level does not increase to a level that would be unsafe and/or undesired for operation of the actuator 204.

The components of the valve positioner 206 may be communicatively coupled as illustrated in FIG. 2 or may be coupled in any other suitable manner. Further, the valve positioner 206 may include any other components for controlling and/or providing pressure to the actuator 204 in addition to or instead of the components illustrated in FIG. 2. Additionally or alternatively, although not shown, the valve positioner 206 may include other signal processing components such as, for example, analog-to-digital converters, digital-to-analog converters, filters (e.g., low-pass filters, high-pass filters, and digital filters), amplifiers, etc.

Figure 3:
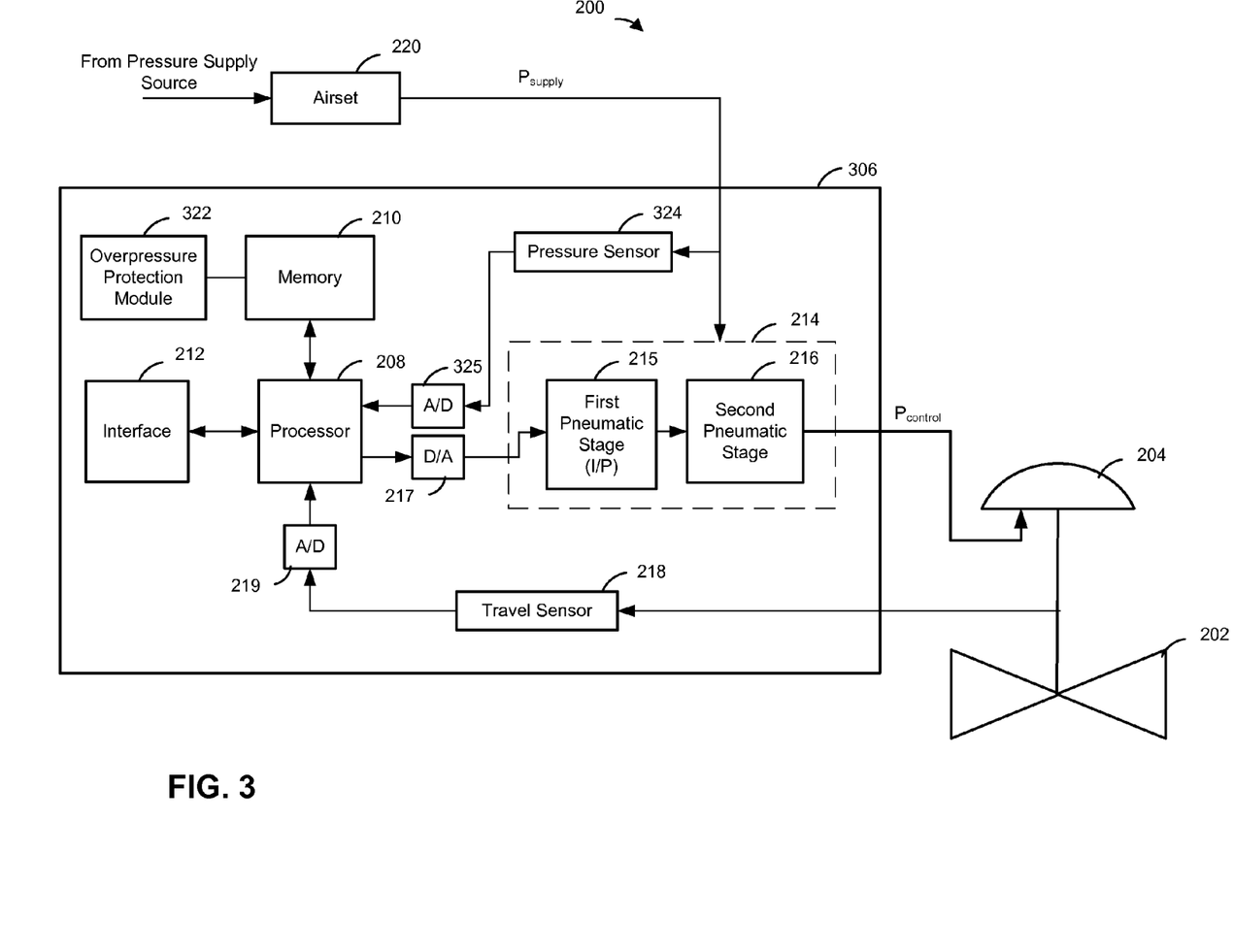
FIG. 3 is a block diagram of an example field device arranged in accordance with another embodiment of the present disclosure. t.

FIG. 3 is a block diagram of the field device 200 arranged in accordance with another embodiment of the present disclosure. In the embodiment of FIG. 3, the valve positioner 206 of FIG. 2 is replaced by a valve positioner 306. The valve positioner 306 is generally similar to the valve positioner 206 and includes many like-numbered elements to the valve positioner 206. However, the valve positioner 306 is configured to detect an abnormal supply pressure provided to the valve positioner 306 rather than detecting an abnormal output pressure as is the case with the valve positioner 206.

The valve positioner 306 includes an overpressure protection module 322 and a pressure sensor 324. The pressure sensor 324 is coupled to a supply pressure of the valve positioner 306 and is configured to measure the level of the supply pressure provided to the valve positioner 306. The pressure sensor 324 may provide the supply pressure measurements to the processor 208. The pressure sensor 324 may be an analog pressure sensor, in which case the output of the pressure sensor 324 may be coupled to an analog to digital converter 325. The analog to digital converter 325 may convert the analog signal produced by the pressure sensor 324 to a digital signal suitable for use by the processor 208. Alternatively, the pressure sensor 324 may be a digital pressure sensor. For example, the pressure sensor 324 may include an analog to digital converter internal to the pressure sensor 324. In this case, the analog to digital converter 325 may be omitted from the valve positioner 306 and the output of the pressure sensor 324 may be provided directly to the processor 208.

The overpressure protection module 322 comprises computer-readable instructions stored in the memory 210 and executable by the processor 208. The overpressure protection module 322 may be the same as or similar to the overpressure protection module 222 of FIG. 2. The overpressure protection module 322 may operate in the same or similar manner to the overpressure protection module 222 to detect an abnormal pressure and, in response to detecting the abnormal pressure, to control the level of the drive signal provided to the first pneumatic stage 215 so as to limit the output pressure of the valve positioner 306. In the embodiment of FIG. 3, however, the overpressure module 322 operates by detecting the abnormal pressure based on supply pressure measurement provided by the pressure sensor 324. For example, the overpressure protection module 322 may obtain a measurement of the supply pressure from the pressure sensor 324 and may compare the obtained supply pressure measurement to a predetermined threshold. The overpressure protection module 322 may detect an abnormal pressure when the supply pressure measurement exceeds the predetermined threshold. In response to detecting the abnormal pressure, the overpressure protection module 322 may control the level of the drive signal provided to the first pneumatic stage 215. For example, the overpressure protection module 322 may set the drive signal to zero milliamperes, set the drive signal to zero millivolts, set the drive signal to another suitable value, prevent further adjustments of the drive signal, prevent further increases in the drive signal, etc., as described above with respect to the overpressure protection module 222 of FIG. 2.

Figure 4:
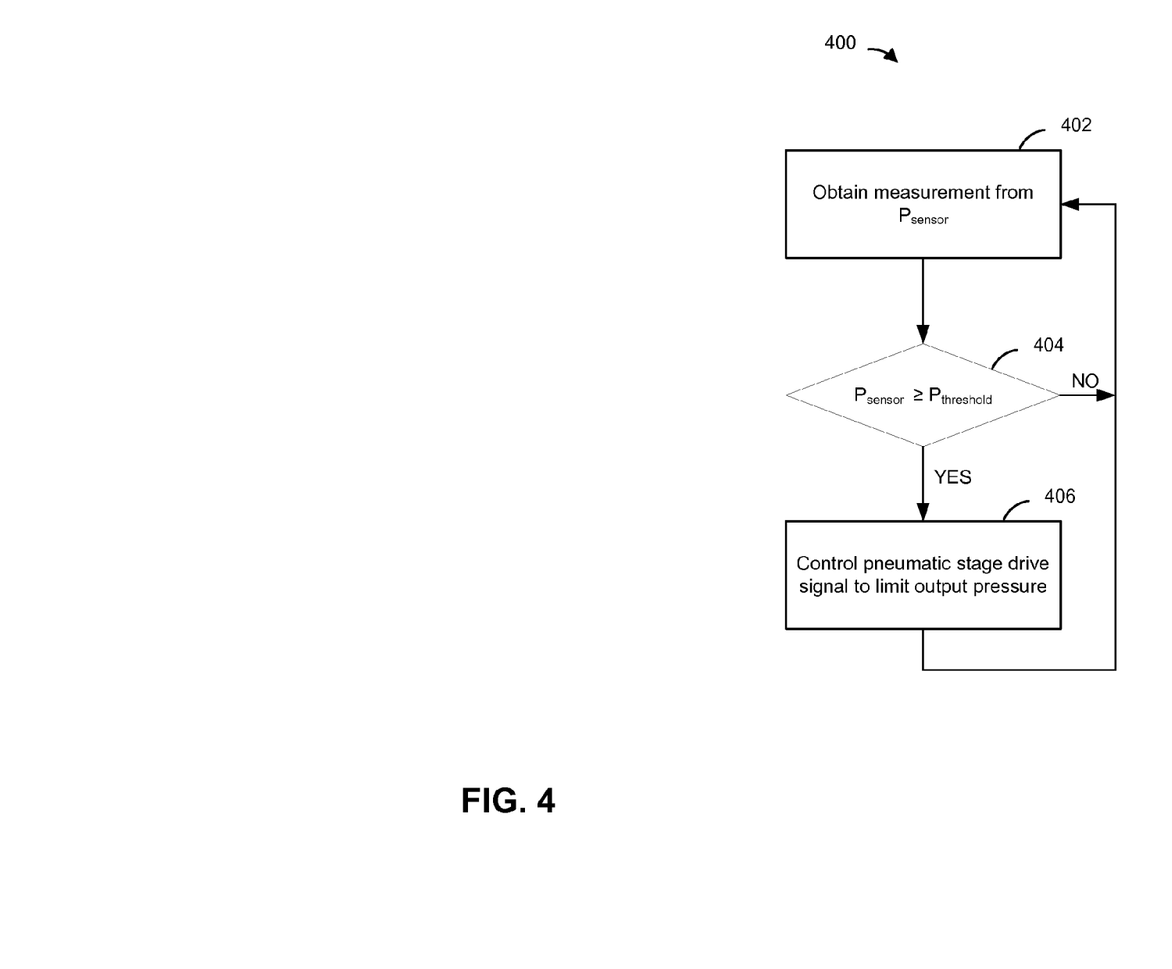
FIG. 4 is a flow chart of an overpressure protection scheme according to an embodiment.

FIG. 4 is a flow chart of an overpressure protection scheme 400 that may be implemented by the overpressure protection module 222 of FIG. 2 or the overpressure protection module 322 of FIG. 3. With reference to FIGS. 2 and 3, the overpressure protection module 222 or the overpressure protection module may operate according to the scheme 400 to control the drive signal provided to the first pneumatic stage 215 so as to limit the output pressure of the valve positioner 206. At block 402, the overpressure protection module obtains a measurement from a pressure sensor, such as a pressure sensor coupled to the output of the valve positioner or a pressure sensor coupled to a supply pressure of the valve positioner. At blocks 404, the overpressure protection module compares the pressure measurement obtained at block 402 to a predetermined threshold. If the measured pressure exceeds the predetermined threshold, then the scheme 400 continues at block 406 at which the overpressure protection module control the drive signal provided to the pneumatic stage of the valve positioner so as to reduce the output pressure of the valve positioner. For example, the overpressure protection module sets the drive signal to a value at or near zero milliamperes, set the drive signal at or near zero millivolts, or set the drive signal to any other suitable value. Alternatively, the overpressure protection module may prevent further adjustments of the drive signal thereby locking the drive signal at the current value of the drive signal. At yet another example, the overpressure protection module may prevent a further increase of the drive signal, while still allowing a decrease in the drive signal, or may control the drive signal in another suitable manner so as to limit the output pressure level of the valve positioner. In any event, the scheme 400 then returns to block 402, at which the processor obtains a next measurement from the pressure sensor.

Returning to block 404, if the comparison at block 404 indicates that the measured pressure does not exceed (e.g., is less than or equal to) the predetermined threshold, then the scheme 400 simply returns to block 402 to obtain a next measurement from the pressure sensor.

Figure 5:
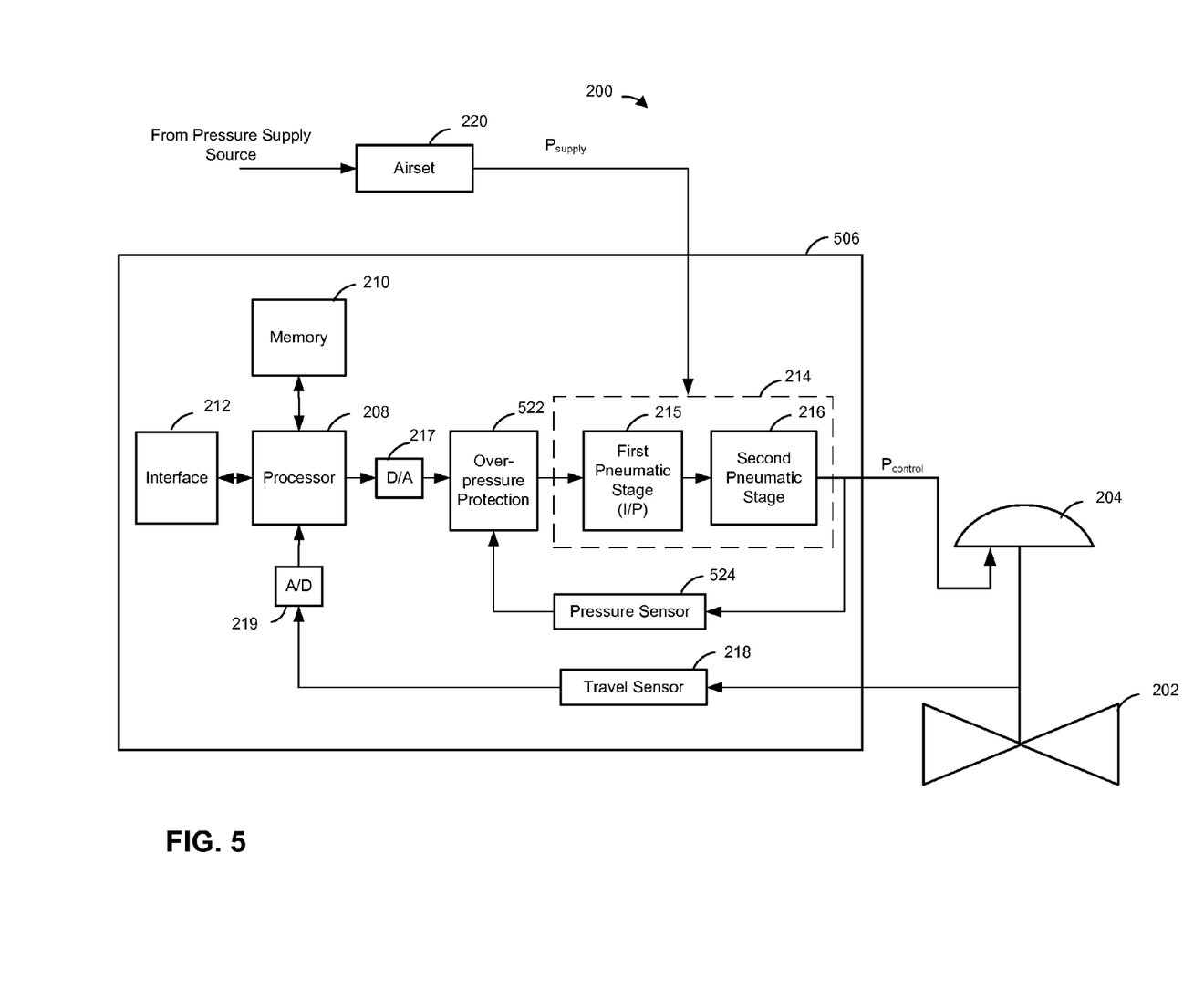
FIG. 5 is a block diagram of an example field device arranged in accordance with yet another embodiment of the present disclosure.

FIG. 5 is a block diagram of the field device 200 arranged in accordance with another embodiment of the present disclosure. In the embodiment of FIG. 4, the valve positioner 206 (FIG. 2) is replaced by a valve positioner 506. The valve positioner 506 is generally similar to the valve positioner 206 of FIG. 2 and includes many like-numbered elements to the valve positioner 206 of FIG. 2. In the embodiment of FIG. 5, overpressure protection is provided by a hardware module, such as control circuit, coupled to the first pneumatic stage 215 and configured to control the drive signal provided to the first pneumatic stage 215 so as limit the output pressure of the valve positioner 506 in response to detecting an abnormal output pressure of the valve positioner 506.

The valve positioner 506 includes an overpressure protection module 522 coupled between the processor 208 and the pneumatic module 214. A pressure sensor 524 is coupled to the output pressure of the valve positioner 506 and is configured to measure the level of the output pressure of the valve positioner 506. The pressure sensor 524 provides the output pressure measurements to the overpressure protection module 522. The overpressure protection module 522 may include analog circuitry and/or digital circuitry configured to detect an abnormal output pressure of the valve positioner 506 based on output pressure measurements provided by the pressure sensor 524. If necessary, the pressure sensor 524 may be coupled to an analog to digital converter, or alternatively to a digital to analog converter, to produce a signal suitable for use by the overpressure protection module 522.

In response to detecting abnormal pressure based on a measurement obtained from the pressure sensor 524, the overpressure protection module 522 operates to affect the level of the drive signal supplied to the pneumatic stage 215 so as to limit the pressure output of the valve positioner 506. For example, the overpressure protection module 522 may, in response to detecting the abnormal pressure, set the drive signal to a level at or near zero milliamperes or at or near zero millivolts (shut off the drive signal), set the drive signal to another suitable value, prevent further adjustments of the drive signal, prevent further increases in the drive signal, etc., as described above with respect to the overpressure protection module 222 of FIG. 2.

Figure 6:
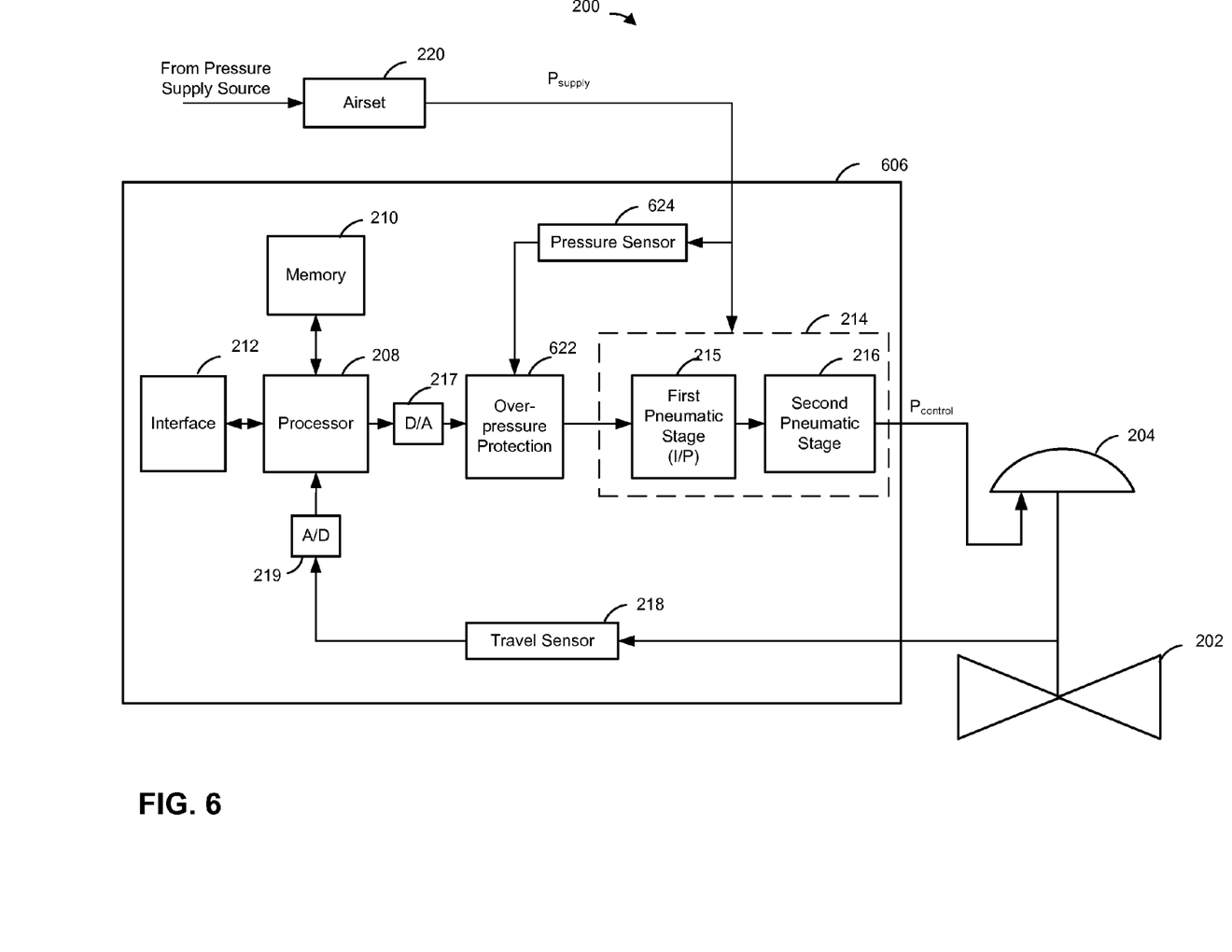
FIG. 6 is a block diagram of an example field device arranged in accordance with still another embodiment of the present disclosure.

FIG. 6 is a block diagram of the field device 200 arranged in accordance with another embodiment of the present disclosure. In the embodiment of FIG. 6, the valve positioner 206 (FIG. 2) is replaced by a valve positioner 606. The valve positioner 606 is generally similar to the valve positioner 506 of FIG. 5 and includes many like-numbered elements to the valve positioner 506 of FIG. 5. In the embodiment of FIG. 6, overpressure protection is provided by a hardware module, such as control circuit, coupled to the first pneumatic stage 215 and configured to control the drive signal provided to the first pneumatic stage 215 so as limit the output pressure of the valve positioner 606 in response to detecting an abnormal supply pressure of the valve positioner 606.

The valve positioner 606 includes an overpressure protection module 622 coupled between the processor 208 and the pneumatic stage 214. A pressure sensor 624 is coupled to the supply pressure of the valve positioner 606 and to the overpressure protection module 624. The pressure sensor 624 is configured to measure the level of the supply pressure of the valve positioner 606 and to provide the supply pressure measurements to the overpressure protection module 622. The overpressure protection module 622 may include analog circuitry and/or digital circuitry configured to detect an abnormal pressure based on supply pressure measurements obtained from the pressure sensor 624. If necessary, the pressure sensor 624 may be coupled to an analog to digital converter, or alternatively to a digital to analog converter, to produce a signal suitable for use by the overpressure protection module 622.

In response to detecting abnormal pressure based on a measurement obtained from the pressure sensor 624, the overpressure protection module 622 controls the level of the drive signal supplied to the pneumatic stage 215 so as to limit the pressure output of the valve positioner 606. For example, the overpressure protection module 622 may, in response to detecting the abnormal pressure, set the drive signal to a level at or near zero milliamperes or at or near zero millivolts (shut off the drive signal), set the drive signal to another suitable value, prevent further adjustments of the drive signal, prevent further increases in the drive signal, etc., as described above with respect to the overpressure protection module 222 of FIG. 2.

Referring to FIGS. 5 and 6, although the valve positioners 506 and 606 are illustrated as digital valve positioners, the valve positioners 506 and 606 may alternatively be analog valve positioners configured to receive an analog command signal, such as a 4-20 mA command signal, and to control a position of the valve 202 in accordance with the analog command signal. In some such embodiments, the interface 212 and/or the processor 208 and the memory 210 may be omitted from the valve positioner 506, 606. In such cases, the analog command signal may be provided to the pneumatic stage 214 via the overpressure protection module 522, 622 to provide overpressure protection for the actuator 204.

In various embodiments described above, the overpressure protection modules 222, 322, 522, 622 may be configured to, in response to detecting an abnormal pressure (e.g., supply input abnormal pressure or control pressure output abnormal pressure), cause a signal indicative of the abnormal pressure to be sent to a controller and/or a host device within the process control system of which the field device 200 is a part, such as to the process controller 11 of FIG. 1. Transmitting a signal indicative of the detected abnormal pressure to a controller or a host device within the process control system may indicate to an operator monitoring the process control system that the airset 220 has failed, and may allow the operator to take an appropriate action, such as repairing or replacing the airset, shutting down the field device 200, shutting down the process control system (or a portion thereof) that includes the field device 200, etc.

Figure 7:
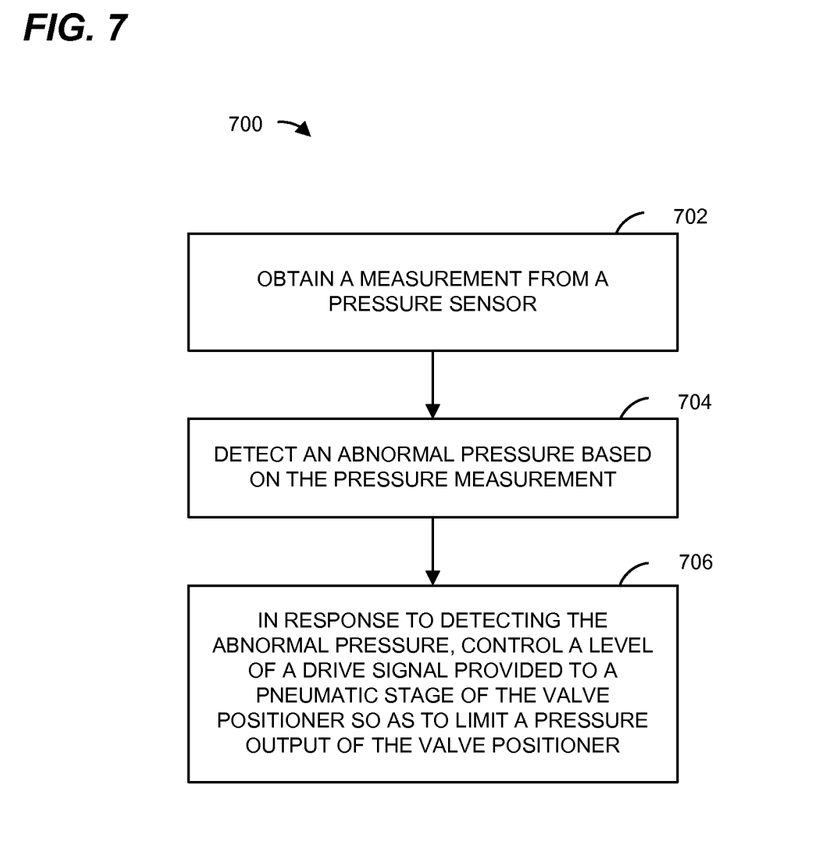
FIG. 7 is a flow chart of an exemplary method for limiting control pressure provided to an actuator of a valve coupled to a valve positioner.

FIG. 7 is a flow chart of an exemplary method 700 for limiting control pressure provided to an actuator of a valve coupled to a valve positioner. In various embodiments, the method 700 is implemented by the field device 200 of FIG. 2. In an embodiment, the method 700 is implemented by the processor 208 in accordance with the overpressure protection module 222 stored in the memory 210. In another embodiment, the method 700 is implemented using a hardware overpressure protection module coupled to a current drive input of a pneumatic stage of the valve positioner. In other embodiments, the method 700 is implemented at least partially using other components of the field device 200 or is implemented by devices other than the field device 200.

At block 702, a pressure measurement is obtained. In an embodiment, the pressure measurement is obtained from a pressure sensor coupled to a control pressure output of the valve positioner. In another embodiment, the pressure measurement is obtained from a pressure sensor coupled to a supply pressure input of the valve positioner. At block 704, an abnormal pressure is detected based on the pressure measurement obtained at block 702. For example, the pressure measurement is compared to a predetermined threshold, and the abnormal pressure is detected when the pressure measurement obtained at block 702 exceeds the predetermined threshold. Then, at block 706, in response to detecting the abnormal pressure at block 704, a drive signal provided to a pneumatic stage of the valve positioner is controlled so as to limit the output control pressure of the valve positioner. For example, the block 706 may include setting the drive signal to zero milliamperes, setting the drive signal to zero millivolts, setting the drive signal to another suitable value, preventing further adjustments of the drive signal, preventing further increases in the drive signal, etc., as described above, in various contemplated embodiments.

While various functions and/or systems of field devices have been described herein as "modules," "components," or "function blocks," it is noted that these terms are not limited to single, integrated units. Moreover, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

The invention claimed is:

1. A process control device, comprising:
a valve;
an actuator coupled to the valve and configured to control a position of the valve; and
a valve positioner coupled to the valve and to the actuator and configured to provide a control pressure to the actuator to control a position of the actuator, the valve positioner comprising:
a pneumatic stage arranged to receive a drive signal and to control output pressure of the valve positioner in accordance with the drive signal, and
an overpressure protection module configured to:
obtain a measurement from a pressure sensor communicatively coupled to the valve positioner;
detect an abnormal pressure based on the pressure measurement; and
in response to detecting the abnormal pressure, control the drive signal so as to limit the output pressure of the valve positioner, wherein the output pressure provides the control pressure to the actuator.

2. The process control device of claim 1, wherein the pressure sensor is configured to measure a level of a supply pressure provided to the valve positioner.

3. The process control device of claim 1, wherein the pressure sensor is configured to measure a level of the pressure output by the valve positioner.

4. The process control device of claim 1, wherein the overpressure protection module is configured to:
compare the pressure measurement to a predetermined threshold; and
determine that the pressure is abnormal when the measured pressure exceeds the predetermined threshold.

5. The process control device of claim 1, wherein the valve positioner includes a processor and a memory, and wherein the overpressure protection module comprises computer readable instructions stored in the memory and executable by the processor.

6. The process control device of claim 1, wherein the overpressure protection module comprises a hardware control circuit.

7. The process control device of claim 1, wherein the drive signal is a current drive signal, and wherein the overpressure detection module is configured to, in response to detecting the abnormal pressure, set the drive signal to a value at or near zero milliamperes.

8. The process control device of claim 1, wherein the drive signal is a voltage drive signal, and wherein the overpressure detection module is configured, in response to detecting the abnormal pressure, set the drive signal to a value at or near zero millivolts.

9. A valve positioner coupled to a process control device comprising a valve and an actuator, the valve positioner configured to receive a control signal from a process control system and to control a pressure supplied to the actuator in accordance with the control signal, the valve positioner comprising:

a pneumatic stage arranged to receive a drive signal and to control output pressure of the valve positioner in accordance with the drive signal, and an overpressure protection module configured to:
- obtain a measurement from a pressure sensor communicatively coupled to the valve positioner;
- detect an abnormal pressure based on the pressure measurement; and
- in response to detecting the abnormal pressure, control the drive signal so as to limit the output pressure of the valve positioner, wherein the output pressure provides the control pressure to the actuator.

10. The valve positioner of claim 9, wherein the pressure sensor configured to measure a level of a supply pressure provided to the valve positioner.

11. The valve positioner of claim 9, wherein the pressure sensor is configured to measure a level of the pressure output of the valve positioner.

12. The valve positioner of claim 9, wherein the valve positioner includes a processor and a memory, and the overpressure protection module comprises computer readable instructions stored in the memory and executable by the processor.

13. The valve positioner of claim 9, wherein the overpressure protection module comprises a hardware control circuit.

14. The valve positioner of claim 9, wherein the drive signal is a current drive signal, and wherein the overpressure detection module is configured to, in response to detecting the abnormal pressure, set the drive signal to a value at or near zero milliamperes.

15. The valve positioner of claim 9, wherein the drive signal is a voltage drive signal, and wherein the overpressure detection module is configured to, in response to detecting the abnormal pressure, set the drive signal to a value at or near zero millivolts.

* * * * *